United States Patent
Whiten

(10) Patent No.: US 10,496,261 B2
(45) Date of Patent: Dec. 3, 2019

(54) USER INTERFACE FOR SEARCHING A LARGE DATA SET

(71) Applicant: Paul Michael Whiten, Singapore (SG)

(72) Inventor: Paul Michael Whiten, Singapore (SG)

(*) Notice: Subject to any disclaimer, the term of this patent is extended or adjusted under 35 U.S.C. 154(b) by 234 days.

(21) Appl. No.: 15/267,224

(22) Filed: Sep. 16, 2016

(65) Prior Publication Data

US 2017/0083221 A1    Mar. 23, 2017

(30) Foreign Application Priority Data

Sep. 18, 2015    (SG) .................. 10201507782W

(51) Int. Cl.
| | | |
|---|---|---|
| *G06F 3/0484* | (2013.01) | |
| *G06F 3/0485* | (2013.01) | |
| *G06F 3/0354* | (2013.01) | |
| *G06F 7/24* | (2006.01) | |
| *H04L 12/58* | (2006.01) | |

(52) U.S. Cl.
CPC ...... *G06F 3/04847* (2013.01); *G06F 3/03548* (2013.01); *G06F 3/0485* (2013.01); *G06F 3/04855* (2013.01); *G06F 7/24* (2013.01); *H04L 51/16* (2013.01)

(58) Field of Classification Search
CPC ............ G06F 3/03548; G06F 3/04847; G06F 3/0485; G06F 3/04855; G06F 17/30029; G06F 7/24
See application file for complete search history.

(56) References Cited

U.S. PATENT DOCUMENTS

| | | | | |
|---|---|---|---|---|
| 5,526,480 A | * | 6/1996 | Gibson | G06F 3/04855 715/210 |
| 6,061,062 A | * | 5/2000 | Venolia | G06F 3/0481 715/856 |
| 6,204,846 B1 | * | 3/2001 | Little | G06F 3/04855 715/784 |
| 6,380,953 B1 | * | 4/2002 | Mizuno | G06F 3/04855 715/764 |
| 6,486,896 B1 | | 11/2002 | Ubillos | |
| 6,937,254 B2 | | 8/2005 | Nishiyama et al. | |
| 8,041,714 B2 | | 10/2011 | Aymeloglu et al. | |
| 8,595,651 B2 | | 11/2013 | Kenemer et al. | |
| 8,904,313 B2 | | 12/2014 | Isensee et al. | |
| 9,122,375 B2 | | 9/2015 | Gardenfors | |
| 9,141,192 B2 | | 9/2015 | Ali et al. | |

(Continued)

*Primary Examiner* — Kieu D Vu
*Assistant Examiner* — Rami R Okasha
(74) *Attorney, Agent, or Firm* — Porter Wright Morris & Arthur, LLP

(57) ABSTRACT

A device, user interface and method for searching a data set presented on a display of the device are disclosed. The method for searching a large data set comprises displaying content comprising at least a portion of the data set in a content window on the display, displaying a slider moveable along a selection path on the display, wherein the selection path corresponds to a range of a field corresponding to a subset of the data set, moving the slider along the selection path to make a selection of a range of the field, displaying the subset of the data set corresponding to the selection in the content window, automatically returning the slider to a return position after the selection has been made and continuing to display the subset of data corresponding to the selection.

19 Claims, 11 Drawing Sheets

(56) References Cited

U.S. PATENT DOCUMENTS

| | | | |
|---|---|---|---|
| 2003/0174173 A1* | 9/2003 | Nishiyama | G06F 3/04855 715/786 |
| 2006/0036942 A1* | 2/2006 | Carter | G06F 3/0485 715/273 |
| 2010/0005420 A1 | 1/2010 | Schneider | |
| 2010/0185976 A1 | 7/2010 | Sadanandan | |
| 2010/0251165 A1* | 9/2010 | Williams | G06F 3/0482 715/784 |
| 2010/0287154 A1* | 11/2010 | Tee | G06F 3/04855 707/708 |
| 2010/0306648 A1* | 12/2010 | Wilairat | G06F 3/04855 715/702 |
| 2011/0057957 A1* | 3/2011 | Kasahara | G06F 1/1626 345/684 |
| 2011/0258569 A1 | 10/2011 | Weir et al. | |
| 2013/0097551 A1 | 4/2013 | Hogan | |
| 2013/0290355 A1 | 10/2013 | Fu | |
| 2014/0215386 A1* | 7/2014 | Song | G06F 3/04855 715/787 |
| 2014/0282252 A1 | 9/2014 | Edwards et al. | |
| 2016/0110091 A1* | 4/2016 | Ji | G06F 3/04845 715/769 |
| 2016/0216873 A1* | 7/2016 | Filippi | G06F 3/04847 |

* cited by examiner

USER INTERFACE FOR SEARCHING A LARGE DATA SET

This patent application claims priority benefit of Singapore Patent Application SG 10201507782W, filed on 18 Sep. 2015.

FIELD OF THE INVENTION

This invention relates to user interfaces for data sets presented on electronic devices such as computers, and more particularly to an improved user interface and related method using a slider which is suitable for searching, sorting and accessing information in large data sets.

BACKGROUND OF THE INVENTION

Large data sets can be difficult to search for relevant information. Large data sets are often structured or organized in some manner, such as chronologically or by category, or amount, for example. The data can be hosted remotely or on a local device. A big challenge with such large data sets is enabling a user of the device to efficiently filter and navigate the data given the screen size limitations and input methods of the mobile device. For example, a messaging application may contain thousands of messages within a conversation through which the user must scroll through to reach a desired date; finding emails in an inbox is difficult to navigate and filter; a music library may contain thousands of songs that can be organised against numerous criteria; an airline booking application will have hundreds of flight routes and thousands of flight options to select from; and sports statistics can produce a very large amount of sortable data.

Known technologies include sliders which allow you to rapidly sort data by a variable. However known sliders are still cumbersome to work with, especially with large data sets, making their use somewhat limited. It would be desirable to provide a user interface which is easy to use and allows for rapid searching and selection of particular information in the data set, even when the data set is quite large.

SUMMARY OF THE INVENTION

In accordance with a first aspect, there is provided a device, user interface and method for searching a data set presented on a display of the device are disclosed. The method for searching a large data set comprises displaying content comprising at least a portion of the data set in a content window on the display, displaying a slider moveable along a selection path on the display, wherein the selection path corresponds to a range of a field corresponding to a subset of the data set, moving the slider along the selection path to make a selection of a range of the field, displaying the subset of the data set corresponding to the selection in the content window, automatically returning the slider to a return position after the selection has been made and continuing to display the subset of data corresponding to the selection.

From the foregoing disclosure and the following more detailed description of various embodiments it will be apparent to those skilled in the art that the present invention provides a significant advance in the technology of user interfaces. Particularly significant in this regard is the potential the invention affords for providing a user interface which is simple to use and allows for relatively rapid access to a user's desired portion of a large data set when searching such large data sets. Additional features and advantages of various embodiments will be better understood in view of the detailed description provided below.

Figure 1:
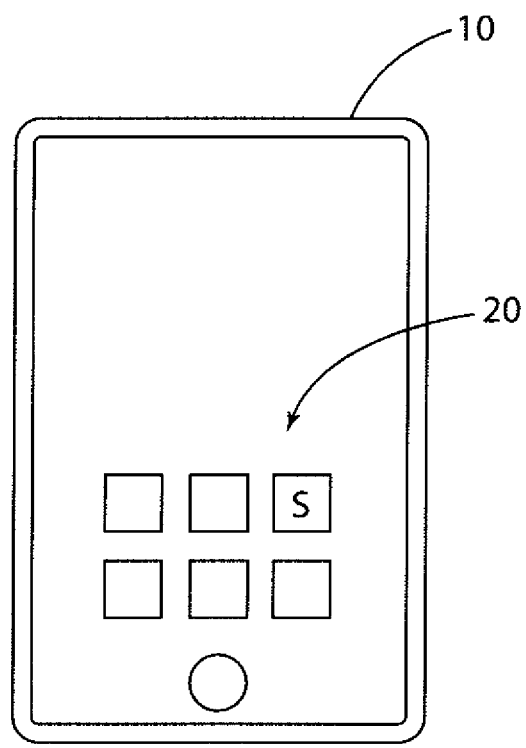
FIG. 1 shows a schematic representation of one embodiment, where the user interface is accessible on a computer such as a mobile device.

It should be understood that the appended drawings are not necessarily to scale, presenting a somewhat simplified representation of various features illustrative of the basic principles of the invention. The specific design features of the user interface as disclosed here, including, for example, the specific location of the content window and the selection path will be determined in part by the particular intended application and use environment. Certain features of the illustrated embodiments have been enlarged or distorted relative to others to help provide clear understanding. In particular, thin features may be thickened, for example, for clarity of illustration. All references to direction and position, unless otherwise indicated, refer to the orientation illustrated in the drawings.

DETAILED DESCRIPTION OF CERTAIN EMBODIMENTS

It will be apparent to those skilled in the art, that is, to those who have knowledge or experience in this area of technology, that many uses and design variations are possible for the user interface disclosed here. The following detailed discussion of various alternate features and embodiments will illustrate the general principles of the invention with reference to a user interface and related method for searching a data set suitable for presentation on the display of a device, such as a mobile device like a phone or tablet. Other embodiments suitable for other applications will be apparent to those skilled in the art given the benefit of this disclosure.

The device can be any electronic device having a processor, a memory, a program and a user interface. Turning now to the drawings, FIG. 1 shows a device 10 in the form of a conventional mobile phone having a display 20. A tablet, laptop, or desktop computer, for example all are convenient alternatives. The display screen is typically a touch (piezoelectric) screen having a series applications, or apps, including S, for a selection slider. Tapping and holding the portion of the display corresponding to the S calls up a user interface which handles a large data set in a known manner. In the example in the drawings, the large data set is a series of text messages. Other suitable data sets could comprise other large amount of data with fields which allow for convenient searching and sorting. The user interface is preferably adapted to work with large data sets from multiple vendors. Music and sports statistics, or other areas with large amounts of data may advantageously use the user interface and method described herein to quickly and efficiently sort large amounts of data.

Figure 2:
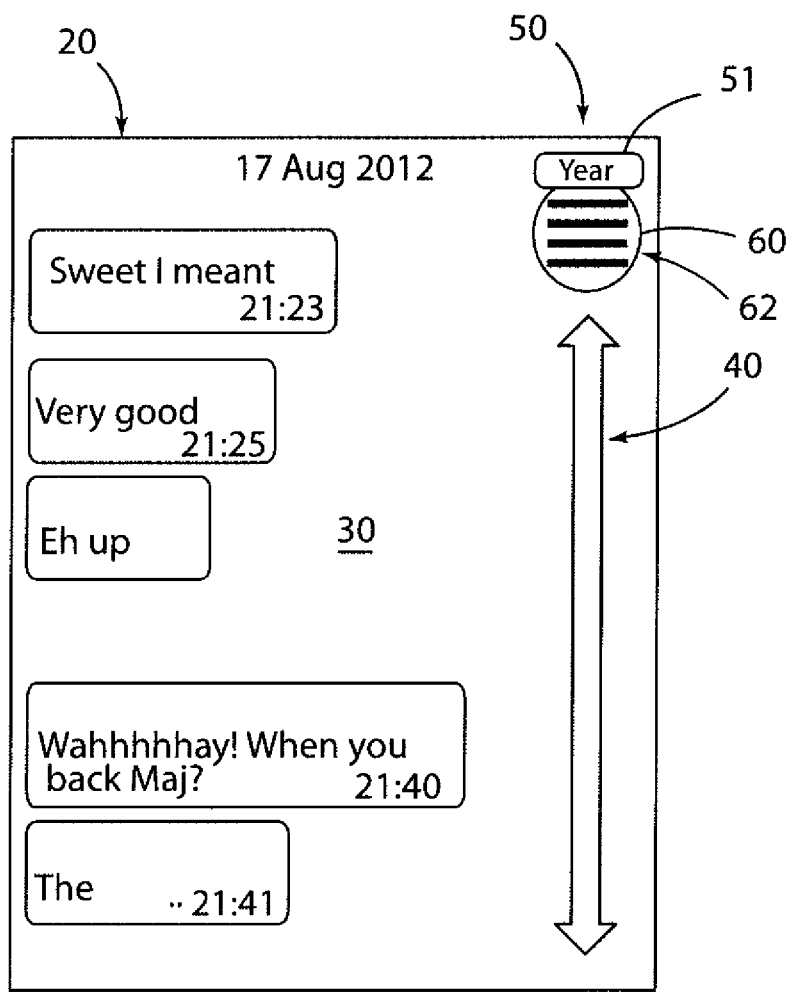
FIG. 2 is a schematic of the display of the mobile device of FIG. 1 shown at a starting position, showing a first field labeling data.

FIG. 2 shows an embodiment of the user interface with the display 20 comprising a content window 30 with content. The content is part of a data set here the content is some of the messages in a chat. Typically it is possible to scroll the content to show portions of the data set in the content window not current visible in the content window of the display. Optionally the content may be labelled specifically (in FIG. 2 showing messages on a specific date: "17 Aug. 2012"). The display also has a label zone 50 and a slider 60. The label zone shows each of the fields used in this user interface, such as a first field 51, here the year, represented by the word "YEAR". The slider 60 can be pressed, dragged and released, and is shown to be moveable along a slider selection path 40. Initially the slider may be at any position along the slider selection path. In FIG. 2, the slider is shown in a first return position immediately adjacent the label zone. The selection path 40 can extend vertically (with respect to the display as normally used) and can comprise equally spaced intervals which correspond to intervals of the first field. In the representative example of FIG. 2, the first field 51 is a year, and the intervals are years. Each field is displayed as a user selected value/grouping from a range or subset of data in the data set. Preferably the field will only be displayed in the label zone if the user has made a selection; otherwise the field is hidden from the user.

Figure 3:
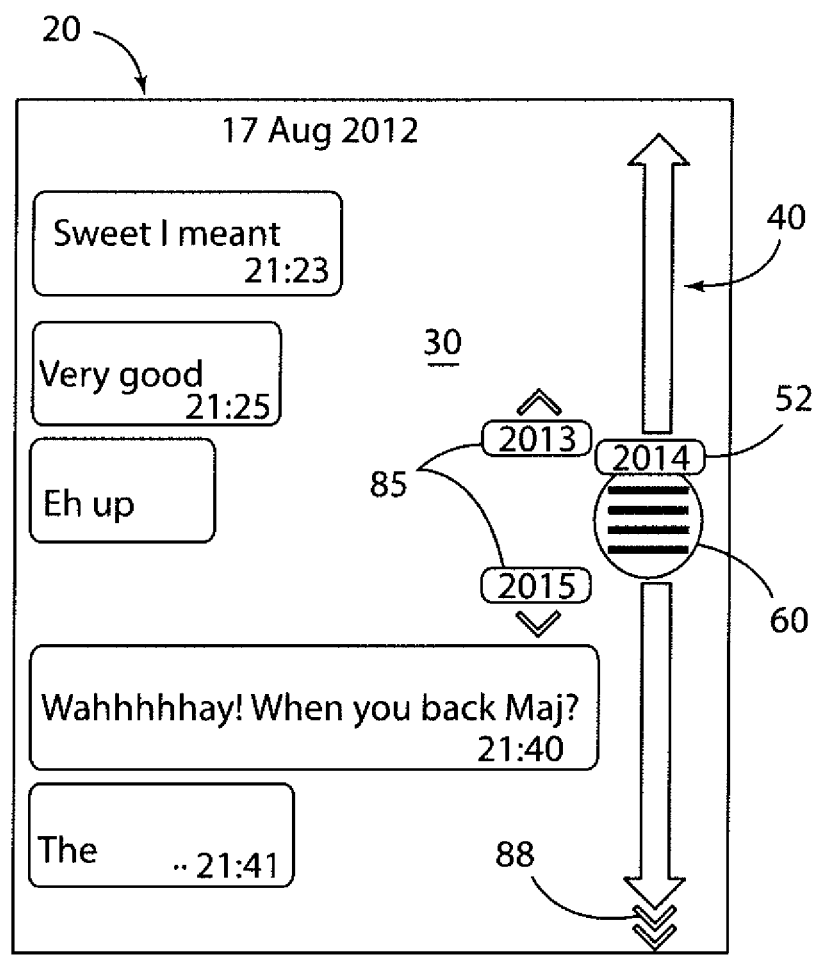
FIG. 3 is a schematic of the display after pressing and holding the slider down, showing an active label, and moving the slider to make a selection.

FIG. 3 shows how a selection is made for the first field. When the slider 60 is slid down to an interval corresponding to 2014, the first message in 2014 appears in the content window. The slider 60 is actuated, typically by tapping and holding for a short period of time. Then, while the user of the device still is in contact with the slider, he drags the slider down along the selection path. Typically, the user touches the slider with his finger, activates the slider and then slides his finger down the portion of the display corresponding to the selection path while still maintaining contact with the slider until the slider is moved to the desired location/interval on the selection path 40. The selection path 40 is shown to extend along a Y-axis or vertically along the display 20. In accordance with an advantageous element, as the slider moves along the selection path, an active label showing possible selections in the range of the field is also visible. In the embodiment shown in FIG. 3, a first active label 52 is presented along with the slider 60 in the selection path, shown traveling along with the slider as the slider moves along the selection path 40. Optionally a previous and next element 85 may be displayed which is continuously updated as the slider moves along the selection path. This can be helpful when there are gaps in the field of the data set (such as multiple days between text messages.) Another optional element is a shortcut 88 which can be present on the display, for example, at the bottom of the selection path.

Tapping and holding or otherwise actuating the shortcut can move the content 30 to show the last items of the field in the content window 40, such as messages at the end of the period of time selected. One additional optional element can be tapping or otherwise actuating the slider button causing the content in the content window to be resent to the first items in the field. In this manner a user can rapidly move between the beginning and the end of a field of a data set.

Figure 4:
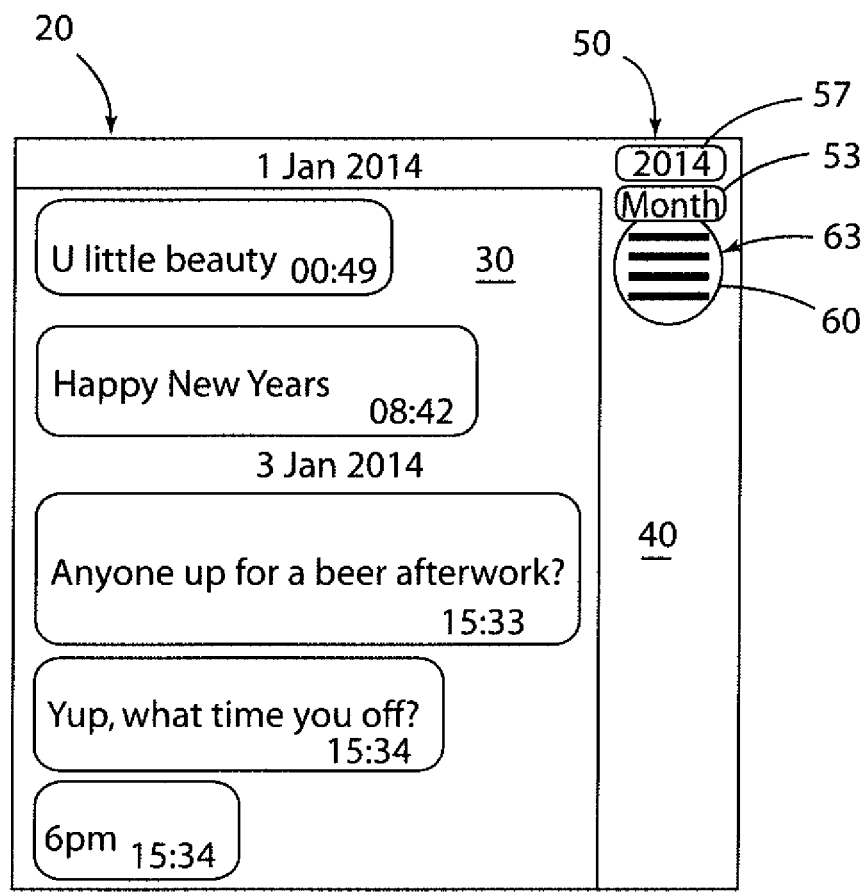
FIG. 4 is a schematic of the display after releasing the slider, showing both the selection made and a second field, and the slider returns to a return position.

FIG. 4 shows what happens after a selection has been made for the first field. The content window 30 is updated with content corresponding to the beginning of the subset of data in the first field. The selection 57 is presented in the label zone 50. Also presented is a second field 53; here the second field is months, and therefore the word "MONTH" appears. Once the slider is slid down the selection path, a second active label is created; this time corresponding to the second field. As before, preferably the active label can travel with the slider, and the presentation on the display changes with each interval of the second field. That is, a series of different named months appears as the active label, helping the user make a selection.

As discussed above, the data set is accessible by operation of the slider 60, data of the data set is grouped into tiers labeled by fields, and selections 57, 58, 59 corresponding to the fields of data (51—first field, 53—second field and 55—third field) in the data set may be made using the slider. Any number of fields may be used, and other fields such as content of a message, name of the person sending the message, time of day of the message, etc., may be substituted as an alternate field. In accordance with a highly advantageous element, the slider is springy. That is, after the user presses and holds the slider, and then slides the slider to make a selection, the user releases the slider, and then the slider automatically returns to a return position after the selection has been made. Also, the subset of data corresponding to the selection continues to be displayed in the content window, and preferably can be reviewed later, even if the display powers down for a period of time due to lack of use of the device, for example. In the embodiment shown in FIG. 4, the return position for the slider 60 is immediately adjacent and below the label zone 50. The return to the return position happens immediately after releasing the slider, so the slider appears to spring back to a position immediately adjacent the label zone. Preferably the next field appears concurrently, ready for a next selection, and the slider is immediately adjacent the next field, as shown.

Figure 5:
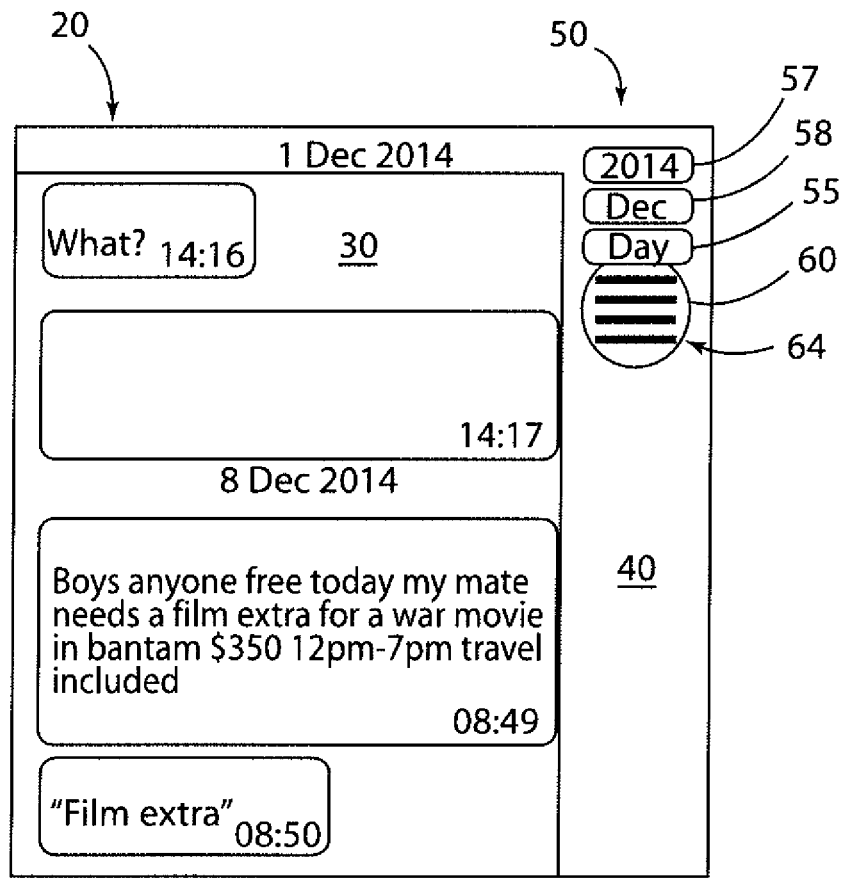
FIG. 5 is a schematic of the display after selecting the selection of the second field of data, and showing a third active level and the slider returned to a return position.

FIG. 5 shows the result of making a second selection 58. Generally multiple selections can be made sequentially, and after each selection is made, each selection is presented in the label zone. In this case, both the first selection 57 (2014) and the second selection 58 (Dec) are visible in the label zone 50. Each of the selections can be stacked vertically one on top of another, with the first tier at the top and with the most recently selected field/value at the bottom of the labels. The slider returns to a return position, here a second return position 63 which is preferably immediately adjacent the label zone 50; and most preferably the slider automatically returns to the second return position 63, slightly below the first return position 62 to allow room for the second selection. The return positions can be the same or different. The intervals of the selection path are, as before, automatically updated to reflect intervals of a new field.

Figure 6:
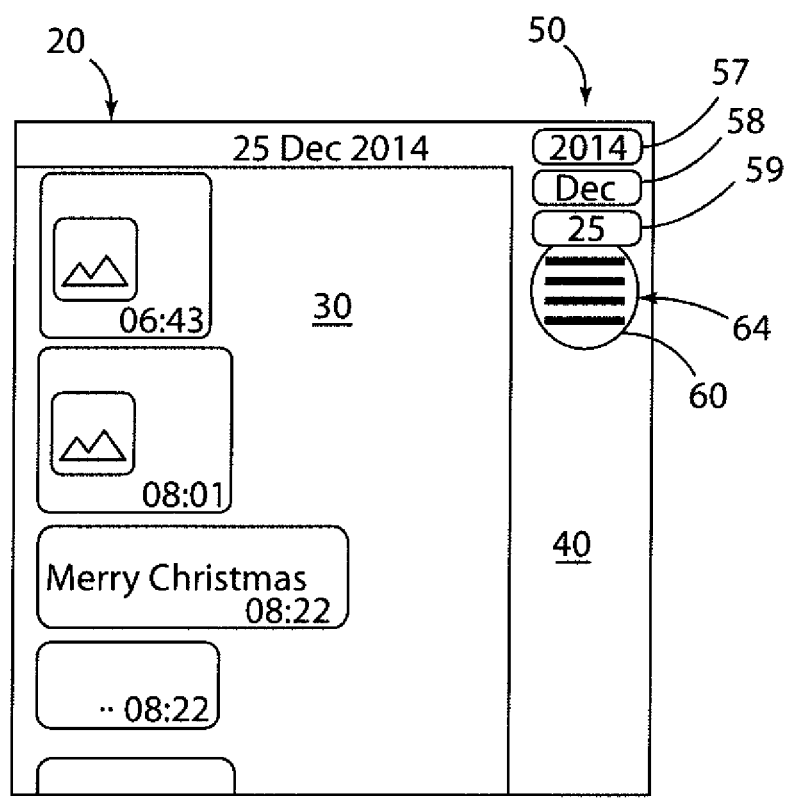
FIG. 6 is a schematic of the display after selecting the selection of the third selection and releasing the slider button, allowing the slider to return to a return position.

FIG. 6 shows the results of making a third selection, which preferably is a process similar to making the second selection. This time, the third field is DAY, and sliding the slider (and third active field) down to make a third selection of a particular day, all three selections 57, 58, 59 are visible in the label zone 50, and the slider has returned to a third return position 64. The first selection and the second selections preferably remains the same while the third selection is being made. The selection path intervals are now days instead of months. The content window 30 may show all of the text messages from the selected day/month/year, ordered chronologically, and may also show a heading. Other techniques for ordering data such as by amount or alphabetically will be readily apparent to those skilled in the art given the benefit of this disclosure. Advantageously only a single slider is required, and a can be operated using just one finger. This process can be repeated additionally if desired. Since it is a repetitive process where efficiency is at a premium, it is highly desirable to have both the active label travel with the slider (and be continuously updated), and to have the slider return to a return position after selections have been made, so additional selections can be made quickly. The user interface and process disclosed herein advantageously eliminates steps which would otherwise make the process more tedious.

Figure 7:
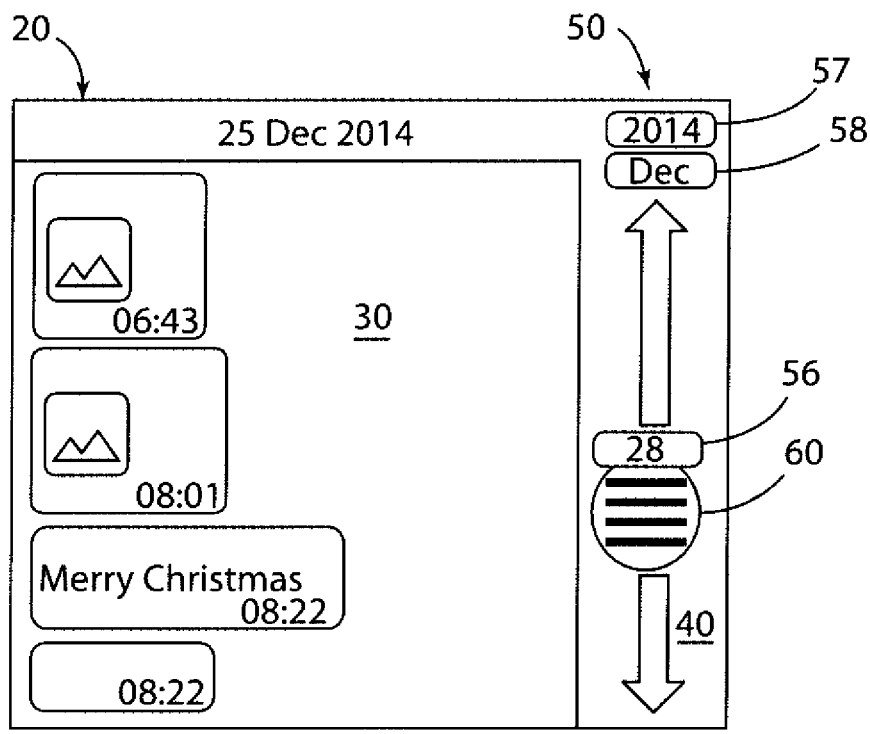
FIGS. 7 and 8 are schematic of the displays showing an embodiment of changing one of the selections; here the third selection is changed from the $25^{th}$ to the $28^{th}$ by pressing, holding and then dragging the slider to the $28^{th}$ (FIG. 7); and then releasing the slider, allowing the slider to return to a return position (FIG. 8).
Figure 8:
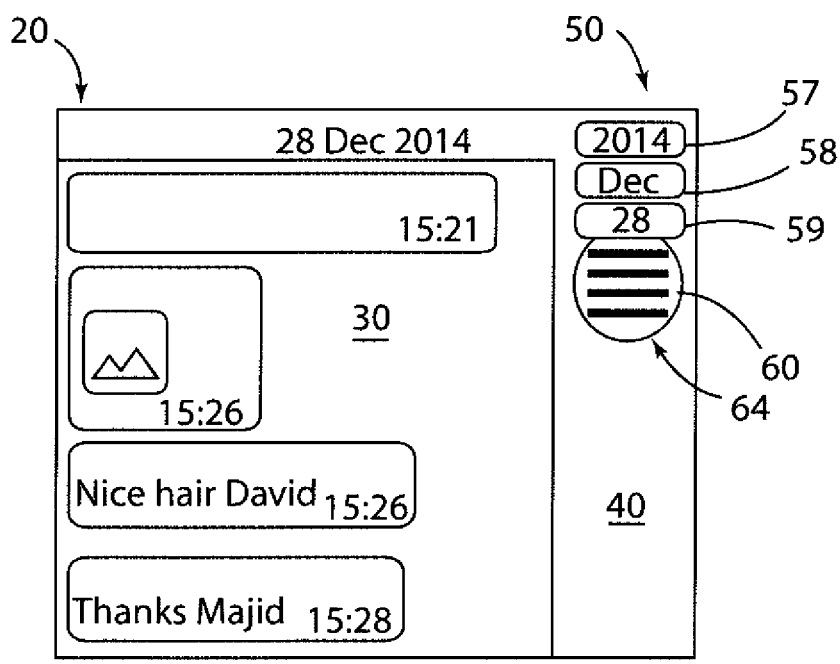

FIGS. 7-8 disclose an embodiment for changing the selection of the data set used for searching. In FIG. 7, the user would like to change the most recently selected selection, here the day, from the 25th to the 28th. The user presses and holds the slider 60 to activate the slider. This turns the third selection back into the third active label 56. Next, the user slides the slider (and third active label 56) on the display down to an interval on the selection path 40 corresponding to the desired new third selection. Once the user had made his new selection, he releases the slider and as before, the slider automatically moves to the third return position 64, the content window is updated with content corresponding to the new selections, and the label zone 50 is updated with the new selections 57, 58, 59. See FIG. 8.

Figure 9:
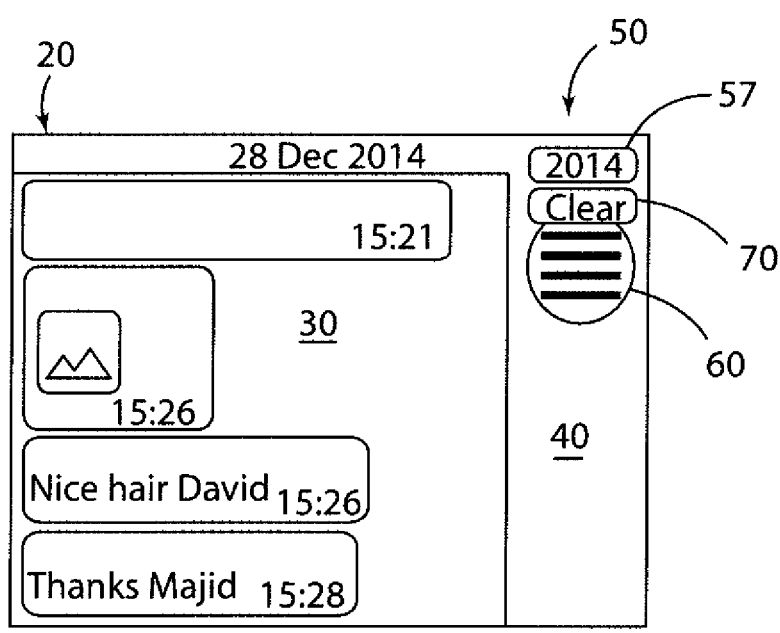
FIG. 9 is a schematic of the display showing an embodiment unsetting or clearing or setting selections.

FIG. 9 discloses an embodiment where selections are reset or cleared. From the position of the various elements of FIG. 8, for example, a user may press and hold the slider 60 and slide the slider toward the label zone 50. As the slider moves toward each selection, that selection is removed, and the field may be so indicated with an indicator 70 such as the word "CLEAR" as shown for the second field 53 in FIG. 9 to inform the user that the selection is reset. Continuing to hold the slider while moving the slider up into the label zone can eliminate all selections. If the user has not made any selections, or has reset the selections, then after release of the slider the return position can be the first return position, for example; the slider may return to its initial position; a first active label may be positioned adjacent the slider; and all the elements of the interface can default to an initial state/positions such as those shown in FIG. 2.

Figure 10:
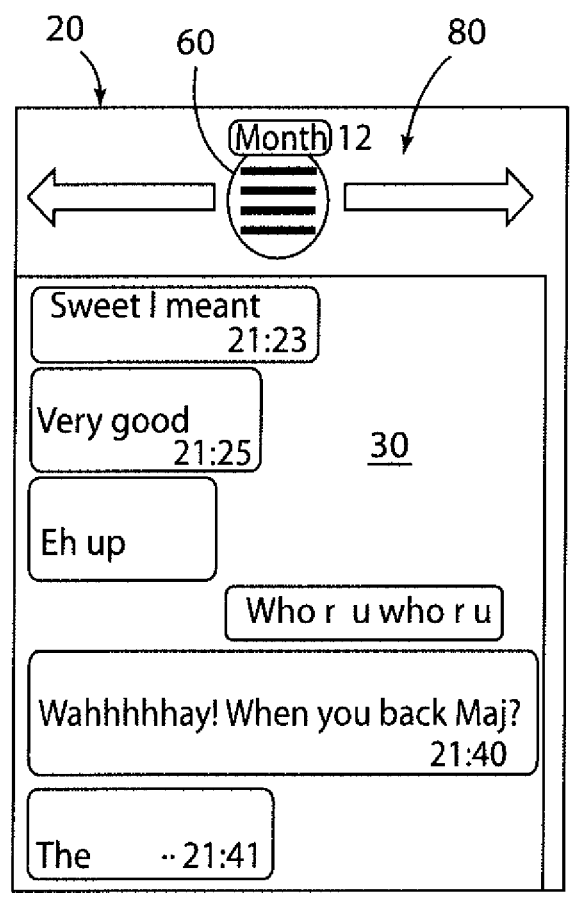
FIGS. 10-12 shows an optional element where the user may change any of the presented fields of data.
Figure 11:
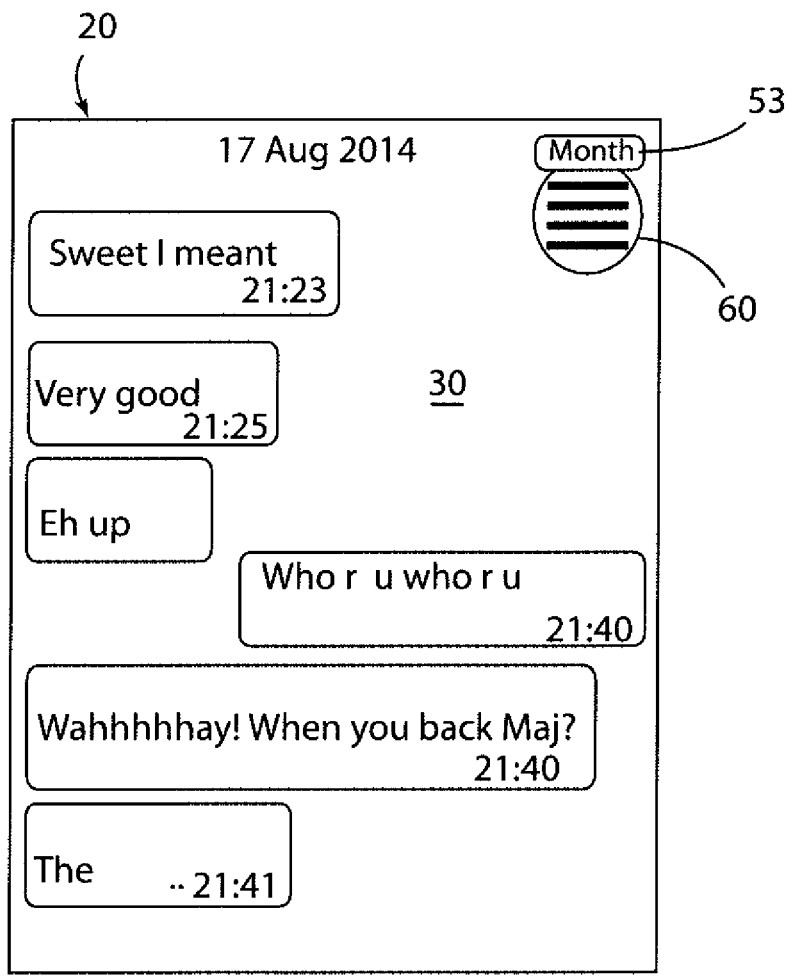
Figure 12:
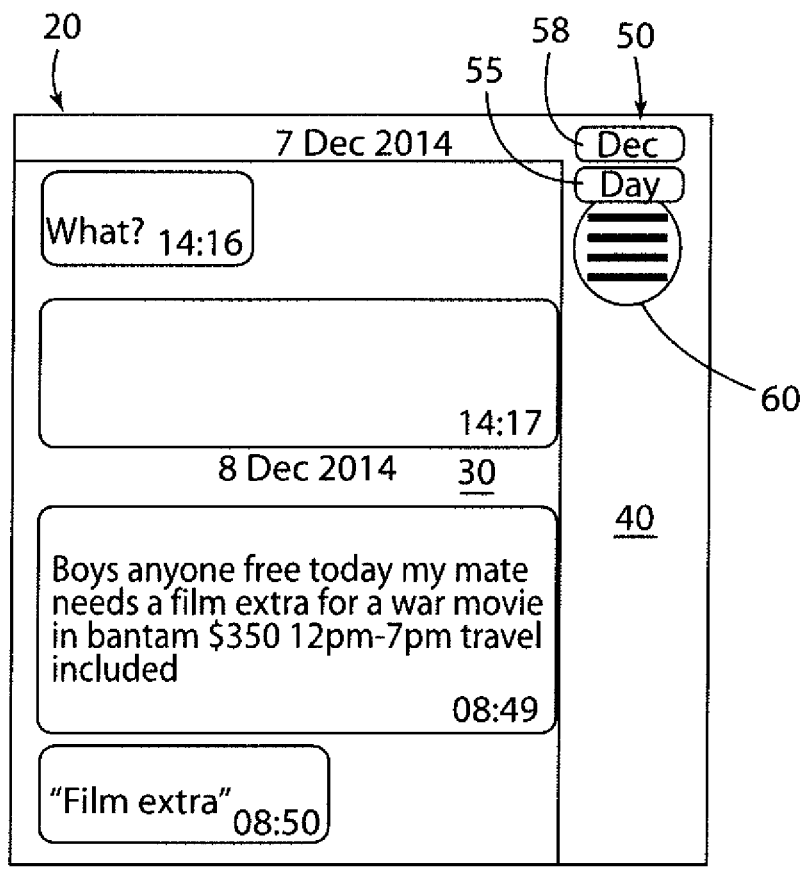

The fields may be set by the developer of the interface. Alternatively, FIGS. 10-12 discloses an option where the user can reset the fields to be used to sort and select in the data set. In this embodiment a field is changed by pressing and holding the slider 60, then moving the slider into the label zone 50, and then sliding the slider in a direction away from the selection path; for example, at a right angle to the selection path. A horizontal field selection path 80 is shown in FIG. 10 which would be similar to the vertical selection path 40 in that the slider can move along it. Preferably the horizontal field selection path is activated to and presented on the display only after a move of the slider into the label zone. In this case the label zone is in one corner of the display, so the slider is moved into the corner to activate presentation of the horizontal field selection path. Other locations on the display for the label zone and the selection paths will be readily apparent to those skilled in the art given the benefit of this disclosure. Horizontal selection path 80 may have intervals corresponding to a series of different fields, including fields not previously selected. Once the slider is moved back to the label zone, a new field is selected. In FIG. 11, the YEAR field has been eliminated and replaced with a MONTH field 53, and the slider is back in the first return position. FIG. 12 shows the process for making selections with the new fields, which can be the same as before, but with a new selection 58 and fields (MONTH, DAY only) in the label zone 50. After releasing the slider, it springs back to a return position and the previously selected next field 59 is ready to be selected. This process can be repeated to select and/or change the order of fields in a manner essentially similar to the process for making selections using the slider on the vertical selection path.

From the foregoing disclosure and detailed description of certain embodiments, it will be apparent that various modifications, additions and other alternative embodiments are possible without departing from the true scope of the invention. The embodiments discussed were chosen and described to provide the best illustration of the principles of the invention and its practical application to thereby enable one of ordinary skill in the art to use the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A method for searching a data set presented on a display of a device, comprising, in combination, the steps of:
   displaying content comprising at least a portion of the data set in a content window on the display;
   displaying a slider moveable along a selection path separate from the content window on the display, and displaying a first field in a label zone of the display corresponding to a subset of the data set, wherein the selection path corresponds to a range of the first field;
   moving the slider along the selection path to make a selection of a value in the range of the first field, wherein the step of moving the slider comprises pressing and holding the slider, and then dragging the slider along the selection path, and the selection of the value is made when the slider is released;
   displaying the subset of the data set corresponding to the selection of the value in the range of the first field in the content window;
   displaying the first field in the label zone of the display, wherein a first return position is adjacent the label zone;
   automatically returning the slider to the first return position after the selection has been made, and continuing to display the subset of data corresponding to the selection of the value in the first field after the slider is released and has automatically returned to the first return position; and
   displaying a second field after the slider has returned to the first return position;
   wherein the second field is a subset of the first field, and the selection path changes to correspond to a range of the second field.

2. The method of claim 1 further comprising clearing the selection by pressing and holding the slider, and then dragging the slider into the label zone.

3. The method of claim 2 further comprising the steps of removing the first field as the slider moves toward the label zone; and presenting an indicator that the first field has been removed.

4. The method of claim 1 wherein as the slider moves along the selection path, an active label showing possible selections in the range of the first field is also visible in the selection path, and continuously updated, and the active label moves with the slider on the display.

5. The method of claim 1 further comprising the step of: displaying a previous element and a next element adjacent the slider as the slider slides along the selection path.

6. The method of claim 1 further comprising the step of changing the selection by pressing and holding the slider, and then moving the slider along the selection path.

7. The method of claim 6 further comprising the step of: removing the first field and the second field by dragging the slider toward the label zone.

8. The method of claim 1 wherein the selection path runs parallel to a direction the subset of data is scrolled in the content window.

9. The method of claim 1 further comprising the steps of
moving the slider along the selection path to make a second selection in the range of the second field;
displaying a subset of the data set corresponding to the second selection in the content window; and
automatically returning the slider to a second return position after the second selection has been made;
wherein the second return position is not the same as the first return position.

10. The method of claim 9 wherein after the slider has returned to the second return position, displaying the first selection, the second selection and a third field, wherein the third field is a subset of the second field.

11. The method of claim 1 wherein the first selection and the second field are visible in the label zone adjacent to one another after the slider has returned to the first return position.

12. The method of claim 1 further comprising the step of changing the field by a user of the device, wherein the step of changing the field comprises pressing and holding the slider, then dragging the slider into the label zone, and then dragging the slider at a right angle to the selection path.

13. The method of claim 1 wherein:
when the slider is moved along the selection path, and no selection is made, returning the slider to the first return position.

14. The method of claim 1 wherein the first field, the second field and a third field comprise a year, a month, and a day, respectively.

15. A device comprising, in combination:
a display displaying content comprising at least a portion of a data set in a content window on the display;
a processor and a memory, each operatively connected to the display;
a first field displayed in a label zone of the display, wherein the first field corresponds to a subset of the data set;
a slider moveable along a selection path separate from the content window on the display, wherein the selection path corresponds to a range of the first field;
wherein the slider is draggable along the selection path, and a selection of a value in the range of the field is made when the slider is released;
the subset of the data set corresponding to the selection of the value of the first field is displayed in the content window;
the slider automatically returns to a first return position after the selection of the value of the first field has been made, and the subset of data corresponding to the selection after the slider is released and has automatically returned to the first return position continues to be displayed; and
a second field is displayed in the label zone after the slider has returned to the first return position, wherein the second field is a subset of the first field, and the selection path changes to correspond to a range of the second field.

16. The device of claim 15 wherein the label zone is positioned in one corner of the display, the selection path is positioned adjacent the label zone, and as the slider moves along the selection path, an active label showing possible selections in the range of the first field is also visible in the selection path.

17. The device of claim 16 wherein the selection, once made, is presented in the label zone.

18. The device of claim 17 wherein multiple selections can be made sequentially, and after each selection is made, each selection is presented in the label zone.

19. The device of claim 15:
wherein the slider moves along the selection path to make a second selection in the range of the second field;
a subset of the data set corresponding to the second selection is displayed in the content window; and
the slider automatically returns to a second return position after the second selection has been made;
wherein the second return position is adjacent to the first return position.

* * * * *